United States Patent
Tang et al.

(10) Patent No.: US 10,137,572 B2
(45) Date of Patent: Nov. 27, 2018

(54) GLASS CLEANING ROBOT OUTAGE EMERGENCY PROCESSING METHOD

(71) Applicant: Ecovacs Robotics Co., Ltd., Suzhou (CN)

(72) Inventors: Jinju Tang, Suzhou (CN); Xiaojun Zhang, Suzhou (CN)

(73) Assignee: Ecovacs Robotics Co., Ltd., Suzhou (CN)

( * ) Notice: Subject to any disclaimer, the term of this patent is extended or adjusted under 35 U.S.C. 154(b) by 185 days.

(21) Appl. No.: 14/435,386

(22) PCT Filed: Oct. 12, 2013

(86) PCT No.: PCT/CN2013/085101
§ 371 (c)(1),
(2) Date: Jul. 2, 2015

(87) PCT Pub. No.: WO2014/056452
PCT Pub. Date: Apr. 17, 2014

(65) Prior Publication Data
US 2015/0314444 A1    Nov. 5, 2015

(30) Foreign Application Priority Data
Oct. 12, 2012 (CN) .......................... 2012 1 0387009

(51) Int. Cl.
*B25J 9/16* (2006.01)
*A47L 1/02* (2006.01)

(52) U.S. Cl.
CPC .............. *B25J 9/1674* (2013.01); *A47L 1/02* (2013.01); *A47L 2201/00* (2013.01); *A47L 2201/04* (2013.01)

(58) Field of Classification Search
CPC .............. B25J 9/1674; A47L 1/02; A47L 1/03
See application file for complete search history.

(56) References Cited

U.S. PATENT DOCUMENTS 7,402,974 B2 *   7/2008   Jeon ..................... G05D 1/021
                                                       180/65.1
8,099,818 B2     1/2012   Miyake et al.
(Continued)

FOREIGN PATENT DOCUMENTS

CN              2684747          3/2005
CN             201200373         3/2009
(Continued)

OTHER PUBLICATIONS

A Beginner's Guide to Accelerometers (hereinafter Beginner's Guide). (Found at: https://www.dimensionengineering.com/info/accelerometers).*
(Continued)

*Primary Examiner* — Adam R Mott
(74) *Attorney, Agent, or Firm* — Nixon Peabody LLP

(57) ABSTRACT

A glass cleaning robot outage emergency processing method comprises the following steps: Step 100 in which a glass cleaning robot (1) operates in an external power supply power-on mode, and is automatically switched to a built-in battery power-on mode when the external power supply suddenly suffers outage; Step 200 in which a control unit controls the glass cleaning robot (1) to walk downward; Step 300 in which when a collision board of the glass cleaning robot (1) collides with a barrier or when the glass cleaning robot (1) walks and reaches an edge of a glass, a sensing unit transfers a signal to the control unit; and Step 400 in which the control unit controls the glass cleaning robot (1) to give an alarm. According to the glass cleaning robot outage emergency processing method, when the external power supply suddenly suffers outage, the power-on mode is switched in time, and the glass cleaning robot is controlled to walk downward and to give an alarm according to (Continued)

Figure 1:
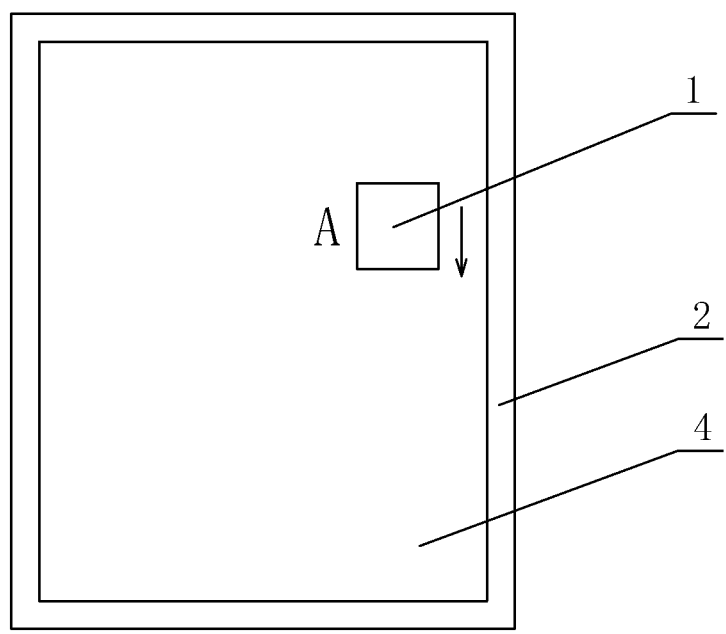

different situations, hereby effectively preventing the glass cleaning robot from falling due to the outage.

8 Claims, 7 Drawing Sheets

(56) References Cited

U.S. PATENT DOCUMENTS

| | | | |
|---|---|---|---|
| 2008/0133054 A1 | 6/2008 | Kim et al. | |
| 2009/0044833 A1* | 2/2009 | Simonette | A47L 1/02 134/18 |
| 2010/0030378 A1* | 2/2010 | Choi | G01S 1/54 700/245 |
| 2013/0060380 A1* | 3/2013 | Ryu | A47L 1/03 700/254 |

FOREIGN PATENT DOCUMENTS

| | | | |
|---|---|---|---|
| CN | 102591337 | 7/2012 | |
| CN | 202515581 | 11/2012 | |
| JP | 05-329068 A | 12/1993 | |
| JP | 06-000458 A | 1/1994 | |
| JP | H07-265238 | 10/1995 | |
| JP | H08-224198 | 9/1996 | |
| JP | 2005-185844 | 7/2005 | |
| KR | 100881926 B1 | 2/2009 | |
| KR | 101081927 B1 * | 11/2011 | A47L 1/03 |
| WO | WO 2004/028324 A1 | 4/2004 | |
| WO | WO 2011/145840 A2 | 11/2011 | |
| WO | WO 2013/149585 A1 | 10/2013 | |

OTHER PUBLICATIONS

International Search Report and Written Opinion dated Jan. 23, 2014 which issued in corresponding International Patent Application No. PCT/CN2013/085101 (20 pages).

Supplementary European Search Report and Written Opinion dated May 16, 2010 which issued in corresponding International Patent Application No. PCT/CN2013/085101 (7 pages).

* cited by examiner

US 10,137,572 B2

GLASS CLEANING ROBOT OUTAGE EMERGENCY PROCESSING METHOD

CROSS-REFERENCE TO RELATED APPLICATIONS

This application is an U.S. national stage of PCT/CN2013/085101, filed on Oct. 12, 2013, which claims priority to Chinese Patent Application No. 201210387009.3, filed on Oct. 12, 2012, the contents of which are each incorporated herein by reference in its entirety.

FIELD OF THE INVENTION

The invention relates to a glass cleaning robot outage emergency processing method, which belongs to the technical field of control of small household electrical appliances.

BACKGROUND OF THE PRIOR ART

The glass cleaning robot also referred to as "Winbot" is a common small household electrical appliance. Generally, while operating normally, the existing Winbot is supplied with power by an external power supply. In addition, the Winbot is provided with a built-in battery which may be a dry battery or a rechargeable battery. The external power supply can recharge the built-in battery while supplying power to the Winbot. When the external power supply suddenly suffers outage due to unforeseen events, the glass cleaning robot is automatically switched to a built-in battery power-on mode. However, if the Winbot locates at a relatively high position on the surface of a glass, it will hamper the user to take down the Winbot and also can easily lead to danger. Furthermore, the higher the position from which the Winbot falls, the more easily the Winbot is damaged or the more seriously pedestrians are hurt.

SUMMARY OF THE INVENTION

In view of the above deficiencies in the prior art, the invention provides a glass cleaning robot outage emergency processing method. When an external power supply suddenly suffers outage, the power-on mode is switched in time, and the glass cleaning robot is controlled to walk downward and give an alarm according to different situations, a timely processing can be achieved, hereby effectively preventing the glass cleaning robot from falling due to outage, and keeping the robot safe and reliable.

In the invention, the following technical solutions are provided to solve the above technical problems.

The invention provides a glass cleaning robot outage emergency processing method comprising:

Step 100: a glass cleaning robot operates in an external power supply power-on mode, and is automatically switched to a built-in battery power-on mode when an external power supply suddenly suffers outage; and Step 200: a control unit controls the glass cleaning robot to walk downward.

In order to prevent the glass cleaning robot from damage due to collision when the glass cleaning robot walks downward or to remind the user in time that the glass cleaning robot has walked and reached an edge of a glass, the following steps are comprised after Step 200:

Step 300: when a collision board of the glass cleaning robot collides with a barrier or the glass cleaning robot walks and reaches an edge of a glass, a sensing unit transfers a signal to the control unit; and Step 400: the control unit controls the glass cleaning robot to give an alarm.

In order to allow the glass cleaning robot to walk vertically downward correctly, the following steps are further comprised between Step 100 and Step 200:

Step 110: the glass cleaning robot determines whether its walking direction is a vertically downward direction; and Step 120: if a result of the determination of Step 110 is YES, Step 200 starts, and if the result of the determination is NO, the control unit controls a walking mechanism of the glass cleaning robot to act so as to rotate a machine body of the glass cleaning robot, and Step 110 is performed again after the rotation.

In detail, Step 110 specifically comprises: in determining the vertically downward walking direction via a gravity accelerometer disposed inside the glass cleaning robot, when the magnitude of an actual acceleration is equal to that of the gravitational acceleration g, the result of the determination of Step 110 is YES, and when the magnitude of the actual acceleration is less than that of the gravitational acceleration g, the result of the determination of Step 110 is NO.

In order to prevent the collision board from pressing against the barrier all the time, Step 310 is further comprised between Step 300 and Step 400: after receiving the signal transferred from the sensing unit, the control unit controls the glass cleaning robot to walk back and then stop walking till a safe distance is kept from the barrier or the edge of the glass.

Step 500 is comprised after Step 400: the glass cleaning robot determines whether the external power supply supplies power normally, and if the external power supply supplies power normally, the control unit controls the glass cleaning robot to stop giving the alarm.

Alternatively, Step 500 is comprised after Step 400: after the glass cleaning robot determines that a machine body thereof has separated from a surface of the glass, the control unit controls the glass cleaning robot to stop giving the alarm.

The invention further provides a glass cleaning robot outage emergency processing method comprising:

Step 100': a glass cleaning robot operates in an external power supply power-on mode, and is automatically switched to a built-in battery power-on mode when an external power supply suddenly suffers outage; and Step 200': a control unit controls the glass cleaning robot to walk downward while giving an alarm.

In order to allow the glass cleaning robot to walk vertically downward correctly, the following steps are further comprised between Step 100' and Step 200':

Step 110': the glass cleaning robot determines whether its walking direction is a vertically downward direction; and Step 120': if a result of the determination of Step 110' is YES, Step 200' starts, and if the result of the determination is NO, the control unit controls a walking mechanism of the glass cleaning robot to act so as to rotate a machine body of the glass cleaning robot and Step 110' is performed again after the rotation.

In order to prevent the glass cleaning robot from damage due to the collision when the glass cleaning robot walks downward, the following steps are comprised after Step 200':

Step 300': when a collision board of the glass cleaning robot collides with a barrier or when the glass cleaning robot walks and reaches an edge of a glass, a sensing unit transfers a signal to the control unit; and Step 400': the control unit controls the glass cleaning robot to stop walking or controls the glass cleaning robot to walk back for a safe distance and then stop walking.

As described above, according to the glass cleaning robot outage emergency processing method of the invention, when an external power supply suddenly suffers outage, the power-on mode is switched in time, and the glass cleaning robot is controlled to walk downward and give an alarm according to different situations, a timely processing can be achieved by user, hereby effectively preventing the glass cleaning robot from falling due to outage, and keeping the robot safe and reliable. In particular, when the external power supply of the glass cleaning robot accidentally disconnects, the glass cleaning robot automatically walks downward to reduce the height of the position of the glass cleaning robot, hereby effectively decreasing the damage possibility or security risk due to accidental falling. Furthermore, when the glass cleaning robot automatically walks and reaches the bottom of the glass, the user can expediently take the glass cleaning robot down for checking faulty or directly repairing the connection to the external power supply, hereby avoiding troubles or security risks caused to the user taking down the glass cleaning robot when the position of the glass cleaning robot is relatively high.

Hereinafter, the technical solutions of the invention will be described in detail in combination with the accompanying drawings and specific embodiments.

DESCRIPTION OF ATTACHED DRAWINGS

Figure 2:
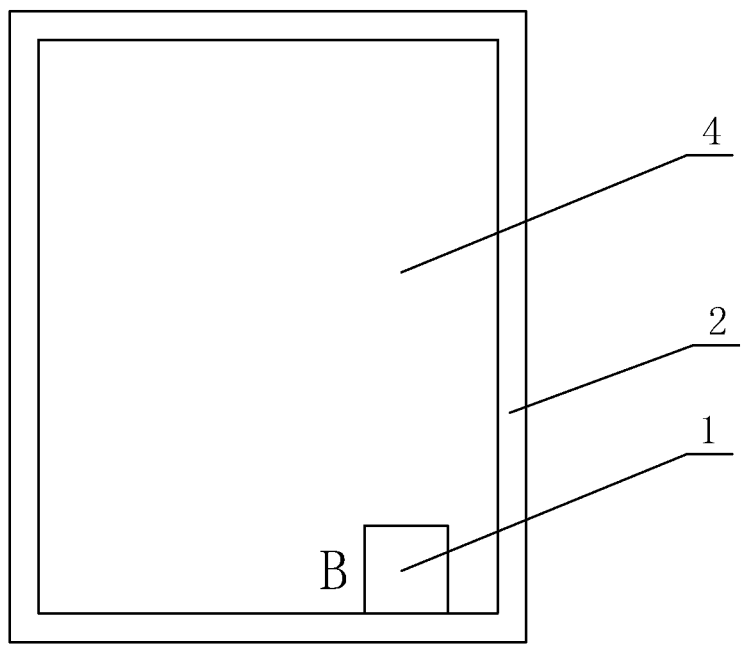
Figure 3:
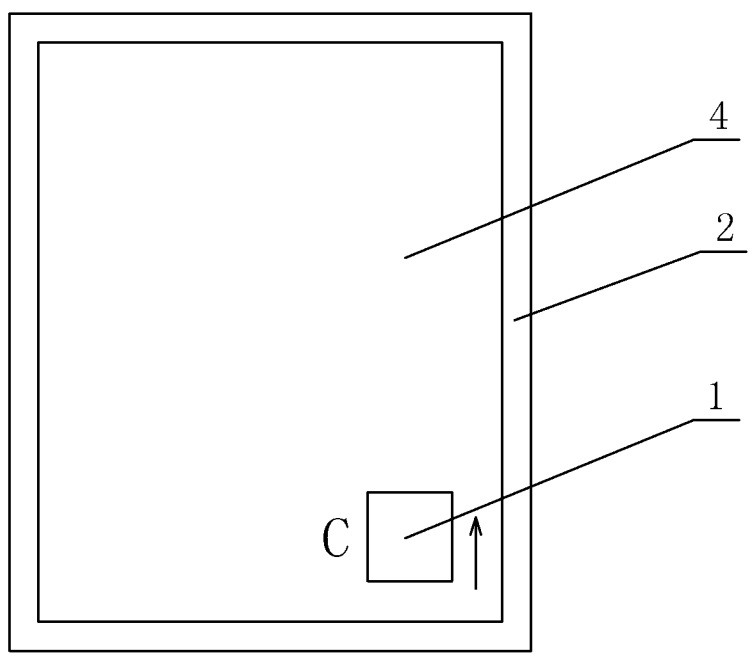
Figure 4:
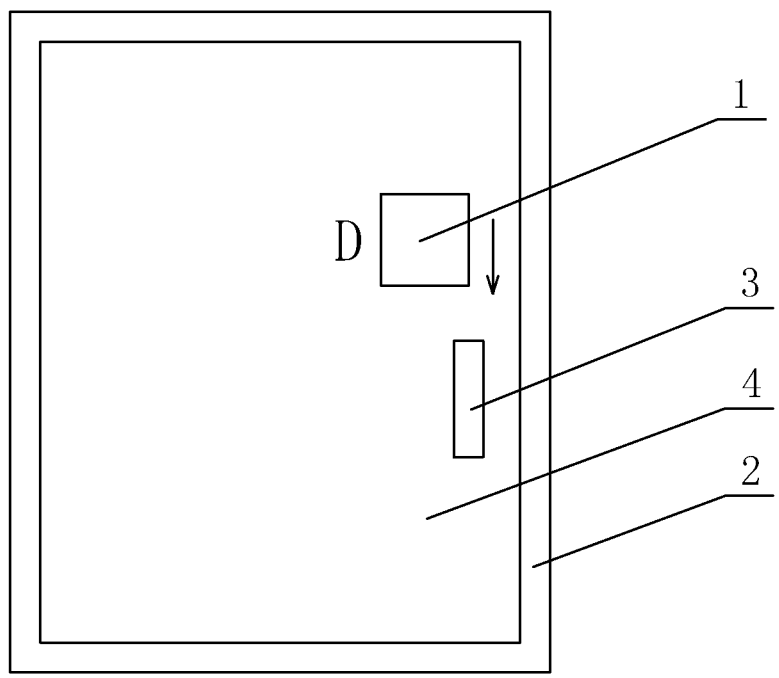
Figure 5:
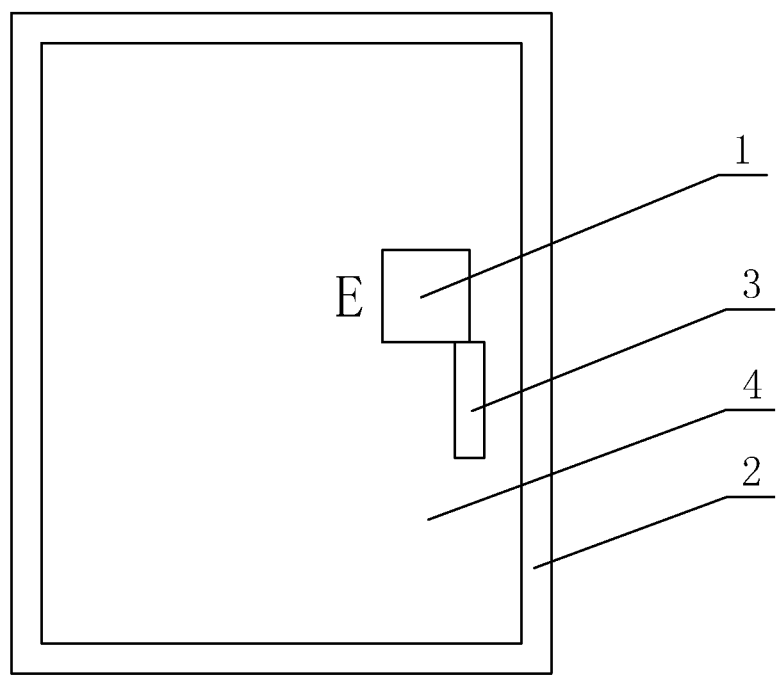
Figure 6:
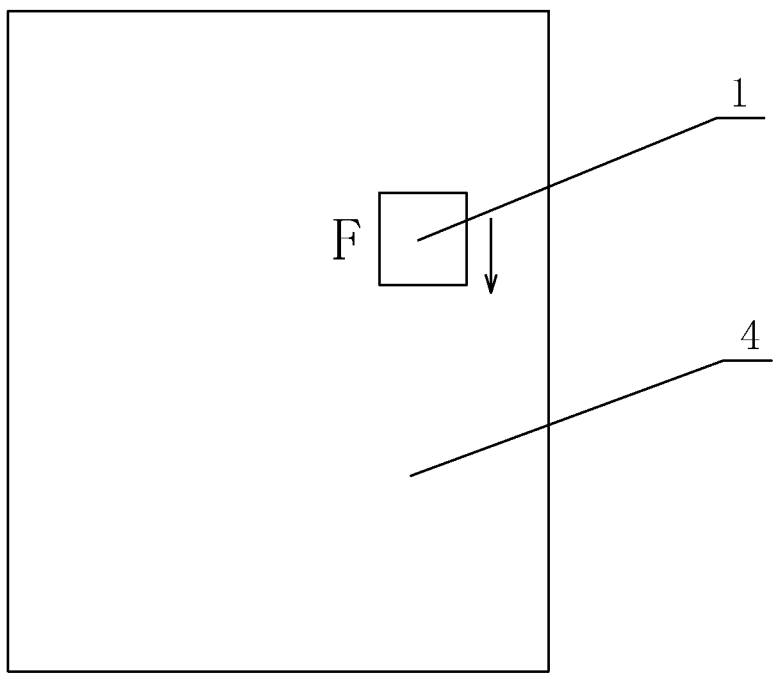
Figure 7:
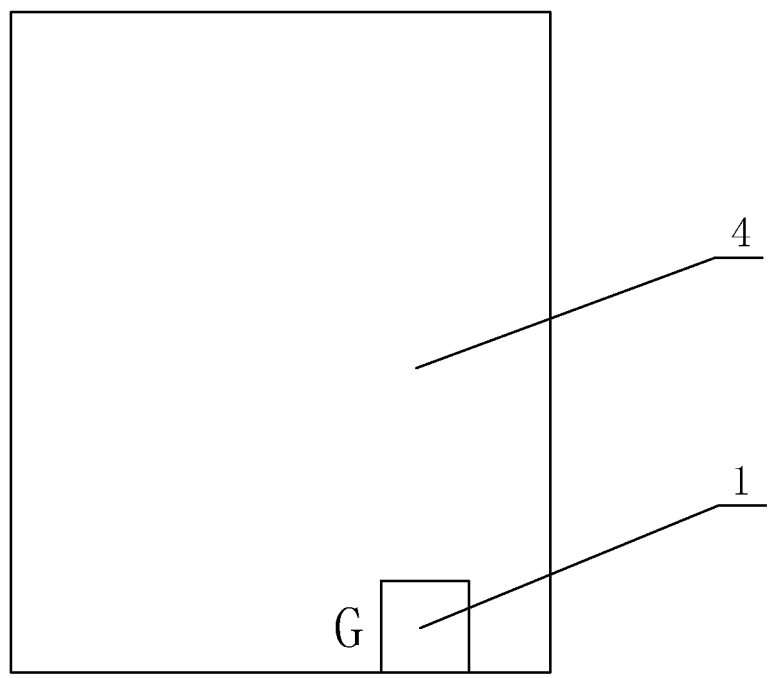

FIGS. 1, 2 and 3 are schematic diagrams of the glass cleaning robot locating at different positions on the surface of a glass to be treated according to the first embodiment of the invention, respectively;

FIGS. 4 and 5 are schematic diagrams of the glass cleaning robot locating at different positions on the surface of the glass to be treated according to the second embodiment of the invention, respectively; and FIGS. 6 and 7 are schematic diagrams of the glass cleaning robot locating at different positions on the surface of the glass to be treated according to the third embodiment of the invention, respectively.

DETAILED DESCRIPTION OF PREFERRED EMBODIMENTS

First Embodiment

FIGS. 1, 2 and 3 are schematic diagrams of the glass cleaning robot locating at different positions on the surface of the glass to be treated according to the first embodiment of the invention, respectively. As shown in FIGS. 1-3, a glass cleaning robot outage emergency processing method according to this embodiment comprises Step 100 in which a glass cleaning robot 1 operates in an external power supply power-on mode, when the glass cleaning robot locates at the position A shown in FIG. 1, and the external power supply suddenly suffers outage, the glass cleaning robot 1 is automatically switched to a built-in battery power-on mode. A built-in battery of the glass cleaning robot 1 may be a rechargeable battery or a dry battery. Under the power supply of the built-in battery, in Step 200, a control unit controls the glass cleaning robot 1 to move downward as shown in FIG. 1. When walking downward, the glass cleaning robot may walk in a vertically downward direction or an obliquely downward direction. Preferably, the glass cleaning robot walk in the vertically downward direction so that its walk path is the shortest and thus more power can be saved.

As shown in FIG. 2, in Step 300, when the glass cleaning robot 1 walks and reaches the bottom (i.e., the position B shown in FIG. 2) of the glass provided with a window frame 2, a collision board (not shown) of the glass cleaning robot 1 collides with the window frame 2, and a sensing unit transfers a signal to the control unit. In Step 400, the control unit controls the glass cleaning robot 1 to give an alarm so as to remind the user to take an emergency processing with respect to the ongoing abnormal condition of the glass cleaning robot 1.

Sure, in order to protect the window frame 2 as well as the glass cleaning robot 1, Step 310 may be comprised between Step 300 and Step 400, in which after receiving the signal transferred from the sensing unit, the control unit controls the glass cleaning robot 1 to walk back and then stop walking till the glass cleaning robot reaches the position C shown in FIG. 3 and keeps a safe distance from the window frame at the bottom of the glass, hereby avoiding the collision board of the glass cleaning robot 1 from pressing against the window frame 2 all the time.

Under the prompt of the alarm voice, the user checks the state of the glass cleaning robot 1. Generally, the glass cleaning robot 1 may be in two conditions: in one condition, the power supply fault is eliminated and the external power supply of the glass cleaning robot 1 restores its power supply; and in the other condition, the glass cleaning robot 1 needs be taken down from the surface of the glass 4 so as to be further checked for fault.

In order to avoid a long alarm time, Step 500 is comprised after Step 400, in which the glass cleaning robot 1 needs to determine whether the external power supply supplies power normally, and if it is determined that the external power supply supplies power normally, the control unit controls the glass cleaning robot 1 to stop giving the alarm.

Alternatively, Step 500 is comprised after Step 400, in which if the glass cleaning robot 1 determines that the machine body of the glass cleaning robot 1 has separated from the surface of the glass 4, the control unit controls the glass cleaning robot 1 to stop giving the alarm. The determination on whether the machine body has separated from the surface of the glass 4 can be implemented through various measures. For example, the determination can be implemented by monitoring the magnitude of the vacuum degree of a suction cup on the glass cleaning robot 1.

In order to allow the glass cleaning robot to walk vertically downward correctly, the following steps are further comprised between Step 100 and Step 200: Step 110 in which the glass cleaning robot 1 determines whether the walking direction is a vertically downward direction; and Step 120 in which when a result of the determination of Step 110 is YES, Step 200 starts, and when the result of the determination is NO, the control unit controls a walking mechanism of the glass cleaning robot to act so as to rotate the machine body of the glass cleaning robot 1, and Step 110 is performed again after the rotation.

In detail, Step 110 specifically comprises: in determining the vertically downward walking direction via a gravity accelerometer disposed inside the glass cleaning robot 1, if the magnitude of the actual acceleration is equal to that of the gravitational acceleration g, the result of the determination of Step 110 is YES, and if the magnitude of the actual acceleration is less than that of the gravitational acceleration g, the result of the determination of Step 110 is NO.

In addition to the gravity accelerometer discussed above, the following ways may be adopted to determine whether the walking direction is a vertically downward direction. For example, a gravimeter is disposed inside the glass cleaning robot and cooperates with a pouring weight. The direction in which the gravimeter measures a force is arranged to be consistent to the walking direction of the glass cleaning robot. When the walking direction of the glass cleaning robot is a vertically downward direction, the gravity of the pouring weight measured by the gravimeter is the largest. Alternatively, a pressure sensitive sensor may be disposed inside the glass cleaning robot and cooperates with a pouring weight. When the walking direction of the glass cleaning robot is a vertically downward direction, the pressure sensitive sensor obtains the largest pressure value (or 0).

Second Embodiment

FIGS. 4 and 5 are schematic diagrams of the glass cleaning robot locating at different positions on the surface of the glass to be treated according to the second embodiment of the invention, respectively. As shown in FIGS. 4 and 5, a glass cleaning robot outage emergency processing method according to this embodiment comprises the following steps. In Step 100', the glass cleaning robot 1 operates in the external power supply power-on mode on the surface of the glass 4. When the external power supply suddenly suffers outage at the position D shown in FIG. 4, the glass cleaning robot 1 is automatically switched to the built-in battery power-on mode. Upon the power supply of the built-in battery, Step 200' is performed in which the control unit controls the glass cleaning robot 1 to walk downward while giving an alarm.

The following steps are comprised after Step 200'. In Step 300', while walking downward, the glass cleaning robot 1 collides with a barrier (e.g., a handle 3) disposed on the surface of the glass 4 at the position E shown in FIG. 5. At this time, in order to protect the glass cleaning robot 1 itself and the handle 3, Step 400' is also needed in which the control unit controls the glass cleaning robot 1 to stop walking, or controls the glass cleaning robot 1 to walk back and stop walking till a safe distance is kept.

In this embodiment, other specific technical features such as the determination on the vertically downward walking direction and the time when the glass cleaning robot 1 stops giving an alarm are the same as those in the first embodiment, and the details thereof are omitted here. Please refer to the relevant contents in the first embodiment.

Third Embodiment

FIGS. 6 and 7 are schematic diagrams of the glass cleaning robot locating different positions on the surface of the glass to be treated according to the third embodiment of the invention, respectively. As shown in FIGS. 6 and 7, the difference of this embodiment from the first and second embodiments lies in that the structure of the surface of the glass 4 to be treated is different. To be specific, in the first and second embodiments, the surface of the glass 4 is provided with the window frame 2. In this embodiment, the surface of the glass 4 has no window frame. A glass cleaning robot outage emergency processing method according to this embodiment comprises: Step 100 in which when the glass cleaning robot 1 operates in the external power supply power-on mode at the position F shown in FIG. 6, and at this time the external power supply suddenly suffers outage, the glass cleaning robot 1 is automatically switched to the built-in battery power-on mode; and Step 200 in which the control unit controls the glass cleaning robot 1 to walk downward.

In order to prevent the glass cleaning robot 1 from falling from the edge of the surface of the glass 4 without window frame when the glass cleaning robot walks downward, the following steps are further comprised after Step 200: Step 300 in which when the glass cleaning robot 1 walks and reaches the edge (for example, the position G shown in FIG. 7) of the glass, the sensing unit transfers a signal to the control unit; and Step 400 in which the control unit controls the glass cleaning robot 1 to give an alarm, and to stop walking or walk back and then stop walking till a safe distance is kept.

In this embodiment, other specific technical features such as the determination on the vertically downward walking direction and the time when the glass cleaning robot 1 stops giving an alarm are the same as those in the first embodiment, and the details thereof are omitted here. Please refer to the relevant contents in the first embodiment.

In combination with the three embodiments as described above, the invention provides a glass cleaning robot outage emergency processing method comprising the following steps:

Step 100: a glass cleaning robot operates in an external power supply power-on mode, and is automatically switched to a built-in battery power-on mode when an external power supply suddenly suffers outage; and Step 200: a control unit controls the glass cleaning robot to walk downward.

In order to prevent the glass cleaning robot from damage due to collision when the glass cleaning robot walks downward, the following steps are comprised after Step 200:

Step 300: when a collision board of the glass cleaning robot collides with a barrier or the glass cleaning robot walks and reaches an edge of a glass, a sensing unit transfers a signal to the control unit; and Step 400: the control unit controls the glass cleaning robot to give an alarm.

In order to allow the glass cleaning robot to walk vertically downward correctly, the following steps are further comprised between Step 100 and Step 200:

Step 110: the glass cleaning robot determines whether its walking direction is a vertically downward direction; and Step 120: if a result of the determination of Step 110 is YES, Step 200 starts, and if the result of the determination is NO, the control unit controls a walking mechanism of the glass cleaning robot to act so as to rotate a machine body of the glass cleaning robot, and Step 110 is performed again after the rotation.

In detail, Step 110 specifically comprises: in determining the vertically downward walking direction via a gravity accelerometer disposed inside the glass cleaning robot, when the magnitude of the actual acceleration is equal to that of the gravitational acceleration g, the result of the determination of Step 110 is YES, and when the magnitude of the actual acceleration is less than that of the gravitational acceleration g, the result of the determination of Step 110 is NO.

In order to prevent collision, Step 310 is further comprised between Step 300 and Step 400: after receiving the signal transferred from the sensing unit, the control unit controls the glass cleaning robot to walk back and then stop walking till a safe distance is kept from the barrier or the edge of the glass.

Step 500 is comprised after Step 400: the glass cleaning robot determines whether the external power supply supplies power normally; and if the external power supply supplies power normally, the control unit controls the glass cleaning robot to stop giving the alarm.

Alternatively, Step 500 is comprised after Step 400: if the glass cleaning robot determines that the glass cleaning robot has separated from the surface of the glass, the control unit controls the glass cleaning robot to stop giving the alarm.

The invention further provides a glass cleaning robot outage emergency processing method comprising:

Step 100': the glass cleaning robot operates in the external power supply power-on mode, and is automatically switched to the built-in battery power-on mode when the external power supply suddenly suffers outage; and Step 200': the control unit controls the glass cleaning robot to walk downward while giving an alarm.

In order to allow the glass cleaning robot to walk vertically downward correctly, the following steps are further comprised between Step 100' and Step 200':

Step 110': the glass cleaning robot determines whether its walking direction is a vertically downward direction; and Step 120': if a result of the determination of Step 110' is YES, Step 200' starts, and if the result of the determination is NO, the control unit controls the walking mechanism of the glass cleaning robot to act so as to rotate the machine body of the glass cleaning robot and Step 110' is performed again after the rotation.

In order to prevent the glass cleaning robot from damage due to the collision when the glass cleaning robot walks downward, the following steps are comprised after Step 200':

Step 300': when a collision board of the glass cleaning robot collides with a barrier or when the glass cleaning robot walks and reaches an edge of a glass, the sensing unit transfers a signal to the control unit; and Step 400': the control unit controls the glass cleaning robot to stop walking or controls the glass cleaning robot to walk back for a safe distance and then stop walking.

As described above, according to the glass cleaning robot outage emergency processing method, when an external power supply suddenly suffers outage, the power-on mode is switched in time, and the glass cleaning robot is controlled to walk downward and give an alarm according to different situations, a timely processing can be achieved, hereby effectively preventing the glass cleaning robot from falling due to outage, and keeping the robot safe and reliable.

The invention claimed is:

1. A glass cleaning robot outage emergency processing method comprising:
   Step 100: a glass cleaning robot (1) operates in an external power supply power-on mode, and is automatically switched to a built-in battery power-on mode when an external power supply suddenly suffers outage;
   Step 110: the glass cleaning robot (1) determines whether its walking direction is a vertically downward direction;
   Step 120: if a result of the determination of Step 110 is YES, Step 200 starts, and if the result of the determination is NO, the control unit controls a walking mechanism of the glass cleaning robot (1) to act so as to rotate a machine body of the glass cleaning robot (1), and Step 110 is performed again after the rotation; and
   Step 200: a control unit controls the glass cleaning robot (1) to walk downward in response to the glass cleaning robot (1) being automatically switched to the built-in battery power-on mode, wherein Step 200 occurs in response to Steps 100, 110 and 120,
   wherein Steps 110 and 120 are performed between Steps 100 and 200, and wherein Step 120 occurs after Step 110.

2. The glass cleaning robot outage emergency processing method according to claim 1, further comprising:
   Step 300: when a collision board of the glass cleaning robot (1) collides with a barrier or the glass cleaning robot (1) walks and reaches an edge of a glass, a sensing unit transfers a signal to the control unit; and
   Step 400: the control unit controls the glass cleaning robot (1) to give an alarm,
   wherein Steps 300 and 400 are performed after Step 200, and wherein Step 400 occurs in response to Step 300.

3. The glass cleaning robot outage emergency processing method according to claim 1, wherein Step 110 further includes:
   in determining the vertically downward walking direction via a gravity accelerometer disposed inside the glass cleaning robot (1), when the magnitude of an actual acceleration is equal to that of the gravitational acceleration g, the result of the determination of Step 110 is YES, and when the magnitude of the actual acceleration is less than that of the gravitational acceleration g, the result of the determination of Step 110 is NO.

4. The glass cleaning robot outage emergency processing method according to claim 2, further comprising:
   Step 310: after receiving the signal transferred from the sensing unit, the control unit controls the glass cleaning robot (1) to walk back and then stop walking until a safe distance is kept from the barrier or the edge of the glass,
   wherein Step 310 is performed between Steps 300 and 400.

5. The glass cleaning robot outage emergency processing method according to claim 2, further comprising:
   Step 500: the glass cleaning robot (1) determines whether the external power supply supplies power normally, and if the external power supply supplies power normally, the control unit controls the glass cleaning robot (1) to stop giving the alarm,
   wherein Step 500 is performed after Step 400.

6. The glass cleaning robot outage emergency processing method according to claim 2, further comprising:
   Step 500: after the glass cleaning robot (1) determines that its machine body has separated from a surface of the glass, the control unit controls the glass cleaning robot (1) to stop giving the alarm,
   wherein Step 500 is performed after Step 400.

7. A glass cleaning robot outage emergency processing method comprising:
   Step 100': a glass cleaning robot (1) operates in an external power supply power-on mode, and is automatically switched to a built-in battery power-on mode when an external power supply suddenly suffers outage;
   Step 110': the glass cleaning robot (1) determines whether its walking direction is a vertically downward direction;
   Step 120': if a result of the determination of Step 110' is YES, Step 200' starts, and if the result of the determination is NO, the control unit controls a walking mechanism of the glass cleaning robot (1) to act so as to rotate a machine body of the glass cleaning robot (1), and Step 110' is performed again after the rotation; and
   Step 200': a control unit controls the glass cleaning robot (1) to walk downward in response to the glass cleaning robot (1) being automatically switched to the built-in battery power-on mode and the control unit further controls the glass cleaning robot (1) to walk downward while giving an alarm, wherein Step 200' occurs in response to Steps 100', 110' and 120', wherein Steps 110' and 120' are performed between Steps 100' and 200'.

8. The glass cleaning robot outage emergency processing method according to claim 7, further comprising:

Step 300': when a collision board of the glass cleaning robot (1) collides with a barrier or when the glass cleaning robot (1) walks and reaches an edge of a glass, a sensing unit transfers a signal to the control unit; and Step 400': the control unit controls the glass cleaning robot (1) to stop walking or controls the glass cleaning robot (1) to walk back for a safe distance and then stop walking, wherein Steps 300' and 400' are performed after Step 200'.

* * * * *